US007058768B2

(12) United States Patent
Willman et al.

(10) Patent No.: US 7,058,768 B2
(45) Date of Patent: Jun. 6, 2006

(54) MEMORY ISOLATION THROUGH ADDRESS TRANSLATION DATA EDIT CONTROL

(75) Inventors: Bryan Mark Willman, Kirkland, WA (US); Paul England, Bellevue, WA (US); Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 10/319,148

(22) Filed: Dec. 13, 2002

(65) Prior Publication Data

US 2003/0200402 A1 Oct. 23, 2003

Related U.S. Application Data

(63) Continuation of application No. 10/124,609, filed on Apr. 17, 2002, now Pat. No. 6,986,006.

(51) Int. Cl.
*G06F 12/00* (2006.01)

(52) U.S. Cl. .................. 711/154; 711/200; 711/203; 713/200

(58) Field of Classification Search ................ 711/200, 711/203, 154; 713/200
See application file for complete search history.

(56) References Cited

U.S. PATENT DOCUMENTS

| 5,892,900 | A | 4/1999 | Ginter et al. ............... 395/186 |
| 6,279,094 | B1 * | 8/2001 | Landau ........................ 711/203 |
| 6,662,289 | B1 * | 12/2003 | Ang ............................ 711/202 |
| 2002/0169979 | A1 * | 11/2002 | Zimmer ...................... 713/200 |

OTHER PUBLICATIONS

Multiprocessor system architectures, Ben Catanzaro, SunSoft press, 1994,pp. 94-113.*
Bugnion, E. et al., "Disco: Running Commodity Operating Systems on Scalable Multiprocessors", *Proceedings of the 16th Symposium on Operating Systems Principles (SOSP)*, 1997, 1-14.
Coffing, C.L. "An x86 Protected Mode Virtual Machine Monitor for the MIT Exokernel", *Submitted to the Department of Electrical Engineering and Computer Science*, May 21, 1999, 1-109.
Goldberg, R.P. "Survey of Virtual Machine Research", *IEEE Computer*, Jun, 1974, 34-45.

(Continued)

*Primary Examiner*—Mano Padmanabhan
*Assistant Examiner*—Duc T Doan
(74) *Attorney, Agent, or Firm*—Woodcock Washburn LLP

(57) ABSTRACT

Isolated memory is implemented by controlling changes to address translation maps. Control over the maps can be exercised in such a way that no virtual address referring to an isolated page is exposed to any untrusted process. Requests to edit an entry in a map are evaluated to ensure that the edit will not cause the map to point to isolated memory. Requests to change which map is active are evaluated to ensure that the map to be activated does not point to isolated memory. Preferably, these evaluations are performed by a trusted component in a trusted environment, since isolation of the memory depends on the evaluation component not being compromised. In systems that require all memory access requests to identify their target by virtual address, preventing the address translation maps from pointing to a portion of memory effectively prevents access to that portion of memory, thereby creating an isolated memory.

86 Claims, 8 Drawing Sheets

OTHER PUBLICATIONS

Popek, G.J. et al., "Formal Requirements for Virtualizable Third Generation Architectures", *Communications of the ACM*, Jul. 1974, 17(7), 412-421.

Smith, J.E. "An Overview of Virtual Machine Architectures", Oct. 26, 2001, 1-20.

Waldspurger, C.A. "Memory Resource Management in VMware ESX Server", *Proceedings of the 5th Symposium on Operating Systems Design and Implementation*, Dec. 9-11, 2002, 15 pages.

* cited by examiner

| Untrusted Environment 310 | Trusted Environment 320 |
|---|---|
| Untrusted User Mode (311) | Trusted User Mode (321) |
| Untrusted Kernel Mode (312) | Trusted Kernel Mode (322) |

*FIG. 3*

MEMORY ISOLATION THROUGH ADDRESS TRANSLATION DATA EDIT CONTROL

CROSS-REFERENCE TO RELATED APPLICATIONS

This application is a continuation-in-part of U.S. patent application Ser. No. 10/124,609, entitled "Page Granular Curtained Memory Via Mapping Control," filed on Apr. 17, 2002, now U.S. Pat. No. 6,986,006, which is hereby incorporated by reference.

FIELD OF THE INVENTION

The present invention relates generally to the field of computer memory. More particularly, the invention provides a technique for achieving memory isolation by controlling changes to an address translation map that is used to convert virtual addresses to physical addresses.

BACKGROUND OF THE INVENTION

A typical computer includes a memory that is, ultimately, accessible to any user of the computer. In the simplest computers, any unit of the memory (e.g., byte, word, double word, etc.) can be identified by its physical address, and a process controlled by any user can issue an instruction to read or write any location of the memory. More sophisticated computers support virtual addressing of the memory— i.e., identification of a memory unit by some value other than the unit's physical address. With virtual addressing, as is known in the art, a virtual address facility such as the computer's memory management unit (MMU) uses a set of translation maps to convert a virtual address into a physical address. When a system supports virtual addressing, any memory location can be made accessible by editing the address translation maps to assign a virtual address to the desired physical memory location.

Mechanisms exist that, in theory, separate memory into different portions such that not every memory location is accessible to every user or process. For example, some computers allow a range of memory to be designated for use only when the processor is operating in kernel mode. Some operating systems enforce a loose isolation among processes by assigning each process its own address space, where at least some portions of the various address spaces are non-overlapping. In a typical environment that supports paged virtual memory, the operating system typically will create page tables for each process such that each process has at least some pages that are not in the page tables for any other process. The same is true for environments whose virtual memory system is based on segmentation. (Page and segment tables are both examples of the more general terms "address translation data" or "address translation map.")

A problem with all of the foregoing systems is that they make scant, if any, pretense at preventing their own defeat at the hands of a determined user. There is certainly a risk when a user edits an address translation map (e.g., the edit may introduce some inconsistency in the maps that causes the system to crash), but this danger will not discourage a skilled attacker who is bent on causing the system to behave in some way that is outside of the intentions of its designers. The page or segment tables may be specified as read-only; however, an attacker has a number of options to circumvent this type of protection, such as:

The attacker may be able to edit the read-only/read-write attributes (by running some rogue kernel mode component—such as a device driver—that makes the change in kernel mode), thereby making the address translation map writeable; or The user can create an address translation map (e.g., a set of page tables or segment tables) from scratch, and then have a rogue kernel mode component load the base address of the new map into the register that specifies the entry point for the tables (e.g., by using a rogue device driver to load the base address of the new page directory into the CR3 register on an INTEL x86 processor).

In many systems, the user can employ a system debugger or kernel debugger to directly change address translations.

As a general proposition, many prior art techniques that are designed to cordon off or isolate a section of memory can be easily circumvented by a local user. Thus, these techniques cannot be relied upon to enforce memory isolation in circumstances where the isolation is used to protect commercially-valuable information (e.g., the decryption key for a best-selling book or first-run movie, or the code that enforces electronic licenses to content or software, etc.), since it must be presumed either that the memory isolation technique was not designed to resist a willful attack, or that there will be sufficient incentive for a person to expend the effort necessary to circumvent the isolation technique.

Because the foregoing techniques are limited in their ability to truly enforce memory isolation, various other techniques have been developed. These techniques include:

Base-bound memory isolation. In this technique, the processor sets up a base-bound register area around a part of physical memory. The processor enforces the rule that trusted code can issue physical addresses to the protected area, but untrusted code cannot. While this technique is effective at isolating memory, it is very awkward, and that awkwardness would be visible to users. For example, since it is difficult to change the amount of trusted memory, the system may have plenty of untrusted memory, but be out of trusted memory (so some programs requiring trusted memory would be unable to run), or there may be long stalls (noticeable to the user) while the system tries to shift around untrusted areas so the trusted areas can be grown.

The proton core (also called thread differential address mapping). In a proton core, most operations execute in ring 1 (on an INTEL x86 processor), and every operation that would touch key I/O elements, or edit page maps, or do a variety of other things, is forced to fault to ring 0, where a small trusted supervisor would run and evaluate the legitimacy of the operation before it is performed. This technique is very inefficient. By one estimate, the overhead required to implement this scheme requires 75% of the available cycles on a machine.

Translation Lookahead Buffer (TLB) load filtering. In this approach, a list of trusted pages is kept. At TLB fill time, the physical page frame number is compared against the list. If the page being added to the TLB in the list (i.e., meaning that untrusted code is trying to load a mapping to a trusted page), the load fails. The problem with this approach is that its speed depends on how well the list of trusted pages is cached. If the list is cached poorly, this technique would add a memory fetch to the end of every TLB fill, which would have an unacceptable overhead cost.

In view of the foregoing, there is a need for a memory isolation technique that overcomes the drawbacks of the prior art.

SUMMARY OF THE INVENTION

The present invention implements isolated memory by ensuring that the address translation map cannot be modified to point to isolated memory. This constraint on the address translation map is achieved by preventing untrusted code from directly modifying address translation maps.

According to aspects of the invention, a computer can be configured to provide two distinct environments: trusted and untrusted. Ordinary code whose trustworthiness has not been verified (i.e., code whose behavior has not been verified, or that cannot be ruled out from possibly serving a malevolent purpose) runs in the untrusted environment. (Ordinary application software, such as games, word processors, spreadsheets, etc., as well as ordinary operating systems, device drivers, and debuggers, generally fall into the untrusted category.) Code whose trustworthiness has been verified in some manner may run in the trusted environment. Some portion of the computer's memory (i.e., the "isolated" or "curtained" memory) is designated as being accessible only to the trusted environment. Any attempt to edit an address translation map that is usable in the untrusted environment triggers an evaluation of the edit: if the edit would cause the map to contain a pointer to the memory that only the trusted environment is allowed to access, then the edit is rejected and is not carried out. It is preferable that the evaluation be performed in the trusted environment by a software or hardware component that has been established as being trustworthy to make this evaluation, since the effectiveness of the memory isolation is dependent on this component: (1) performing its function correctly, and (2) being resistant to attacks that would undermine the component's ability to perform its function. Additionally, whenever an attempt is made in the untrusted environment to replace the active address translation map with a new map, the new map must be validated—either by ensuring that it is on a list of maps that have previously been validated, or by ensuring that the new map does not contain any mappings to isolated memory. Preferably, this check of the new page map is performed by a trusted component in the trusted environment. The result of evaluating map edits or changes in this manner is that, in the untrusted environment, the active page map can never contain a mapping to isolated memory, which, in turn, means that isolated memory will never have a virtual address in any process running in the untrusted environment.

In the example of the INTEL x86 processor, all requests to access memory are issued by virtual address. Thus, preventing the isolated memory from exposing a virtual address to any untrusted code effectively prevents untrusted code from accessing isolated memory. In other types of systems that allow both virtual and physical addressing of memory, the invention creates a situation where it is only necessary to evaluate physical address access requests. Even in systems that allow physical addressing, most access requests are made by virtual address, so much efficiency in the enforcement of memory isolation can be achieved if isolated memory can be prevented from having a virtual address.

One technique for implementing the invention is to assign an attribute called "page special" to those portions of the memory that store address translation maps. The memory manager will allow a process to read pages with the "page special" attribute, but can be configured to treat write attempts on such pages differently—e.g., notifying the trusted environment of such write attempts, so that the write attempt can be evaluated and, if necessary, aborted. In a preferred embodiment, the "page special" attribute is simply the conventional "read-only" attribute, which causes an exception to be generated whenever an attempt is made to write to read-only memory. The handler for this exception can then evaluate the legality of the write (and, possibly, change the write to make it legal) before the write is allowed to proceed.

Another technique for implementing the invention, which can be used together with the first technique, is to limit the set of address translation maps that can be activated in the untrusted environment. Thus, the invention will allow the activation of maps that have previously been verified not to point to isolated memory; and before any new (unrecognized) map is activated, the map is verified to ensure that it does not point to isolated memory and, preferably, satisfies various other standards. For example, the INTEL x86 processor architecture includes a register called CR3 which contains a pointer to the base address of the page directory for the active page map. A list of base addresses for known legitimate page directories can be maintained. Anytime an attempt is made to load the CR3 register, the address to be loaded can be verified against the list. If the address is on the list, then the load is allowed to proceed. If the address is not on the list, then the map pointed to by the new address is checked to make sure that it does not point to isolated memory. If the new map is deemed acceptable, then the address is put on the approved list for future use; if the new map is not deemed acceptable, then the load is denied, or, the new map is edited to make it acceptable, and then put on the approved list. This type of verification can be implemented by configuring the hardware to generate a fault or exception whenever an attempt is made to load the CR3 register, where the handler for the exception operates in the trusted environment and evaluates the load. While the preceding example is specific to the INTEL x86 architecture, this technique can be implemented in any system that allows one of several address translation maps to be activated, by ensuring that any attempt to replace the active map with a new map triggers an evaluation of the legitimacy of the replacement.

A system according to the invention maintain a list of memory locations (e.g., pages, segments, etc.) that cannot be accessed directly by the untrusted environment and/or by untrusted hardware. This list (which is typically maintained in the form of a bit vector called "D" that stores a Boolean value for every page (or segment) of memory) comprises the set of pages that have been set aside for trusted data (i.e., the isolated memory), as well as the set of pages (or segments) that store address translation mapping data. The vector D is used by hardware that mitigates direct memory access to determine when attempts by untrusted components to access certain pages (or segments) of memory should generate a fault so that the access request can be subjected to further evaluation. Other vectors are also maintained that store: the list of pages that make up the isolated or "trusted" memory ("T"); the list of pages that are part of address translation maps ("P"), and the list of pages that are known root addresses for legitimate page maps ("R").

In accordance with the invention, a page (or segment) of memory that is not part of the isolated memory (i.e., not a member of T) may be "seized" to become part of the isolated memory. The process of seizing a new page includes: ensuring that the page is not already a member of T; adding the page to D; removing mappings to the seized page from existing page maps and from the TLB; and (in the case of multi-processor systems), waiting for pending writes to the new page from other processors to complete before adding the seized page to T.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a block diagram of an exemplary system having both trusted and untrusted environments;

DETAILED DESCRIPTION OF THE INVENTION

Overview

The invention is directed to a technique for creating an isolated or "curtained" memory by controlling changes to the address translation maps. The principle that underlies the invention is that preventing the address translation maps from pointing to isolated memory prevents isolated memory portions from having virtual addresses, which, in turn, prevents code from using virtual addresses to access the isolated memory. Thus, the problem of preventing access to isolated memory is greatly simplified, since it is known that any request that identifies its target address by a virtual address cannot read or write a portion of isolated memory. The invention is useful in a system that has both trusted and untrusted environments: In the trusted environment, address translation maps may be permitted to point to isolated memory where sensitive or valuable data is stored; in the untrusted environment, address translation maps are not permitted to point to isolated memory. Any attempt in the untrusted environment to perform an action that would change an entry in the map, or would replace the active map, is evaluated by a trusted component in the trusted environment before the change or replacement is allowed to proceed, to ensure that the entry change or map replacement will not cause the active map to point to isolated memory.

In a system where all memory accesses are made through the address translation map (e.g., systems based on the INTEL x86 processor), controlling map changes in the manner described above completely implements memory isolation. Even in systems that allow memory to be accessed by both physical and virtual addresses, controlling map changes simplifies the process of evaluating those access request that are made by virtual address.

Exemplary Computing Environment

Figure 1:
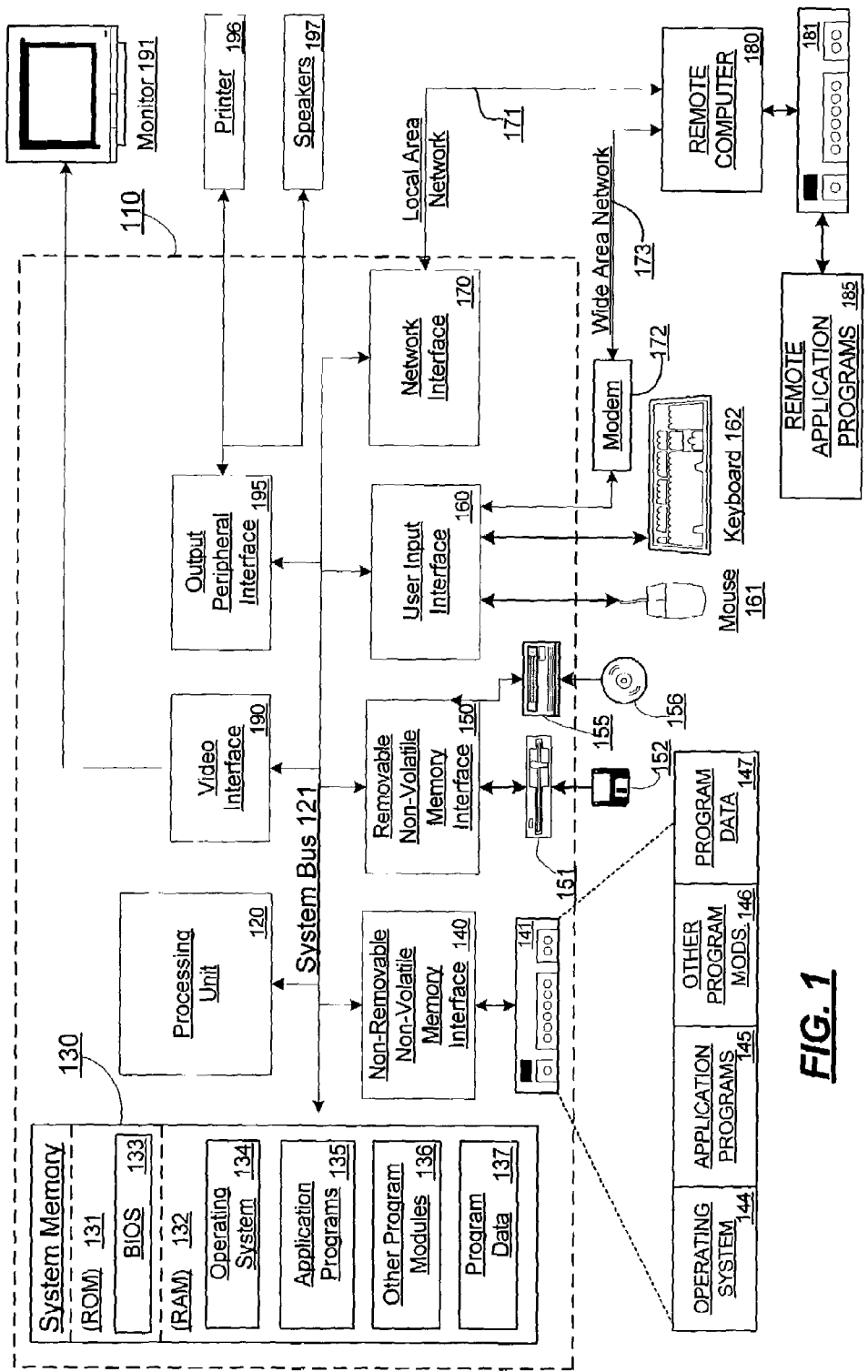
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, embedded systems, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Virtual Memory System

The invention takes advantage of the way that virtual addressing works in order to control access to a portion of memory. As is known in the art, each location of a computer's memory (e.g., each byte of RAM 132, shown in FIG. 1), is associated with a physical address, but virtual addressing allows a memory location to be accessed by some identifier other than its physical address. An association between virtual addresses and physical is established by an address translation map. Given a virtual address, a translation algorithm determines how to use the map to translate the virtual address into a physical address.

Figure 2:
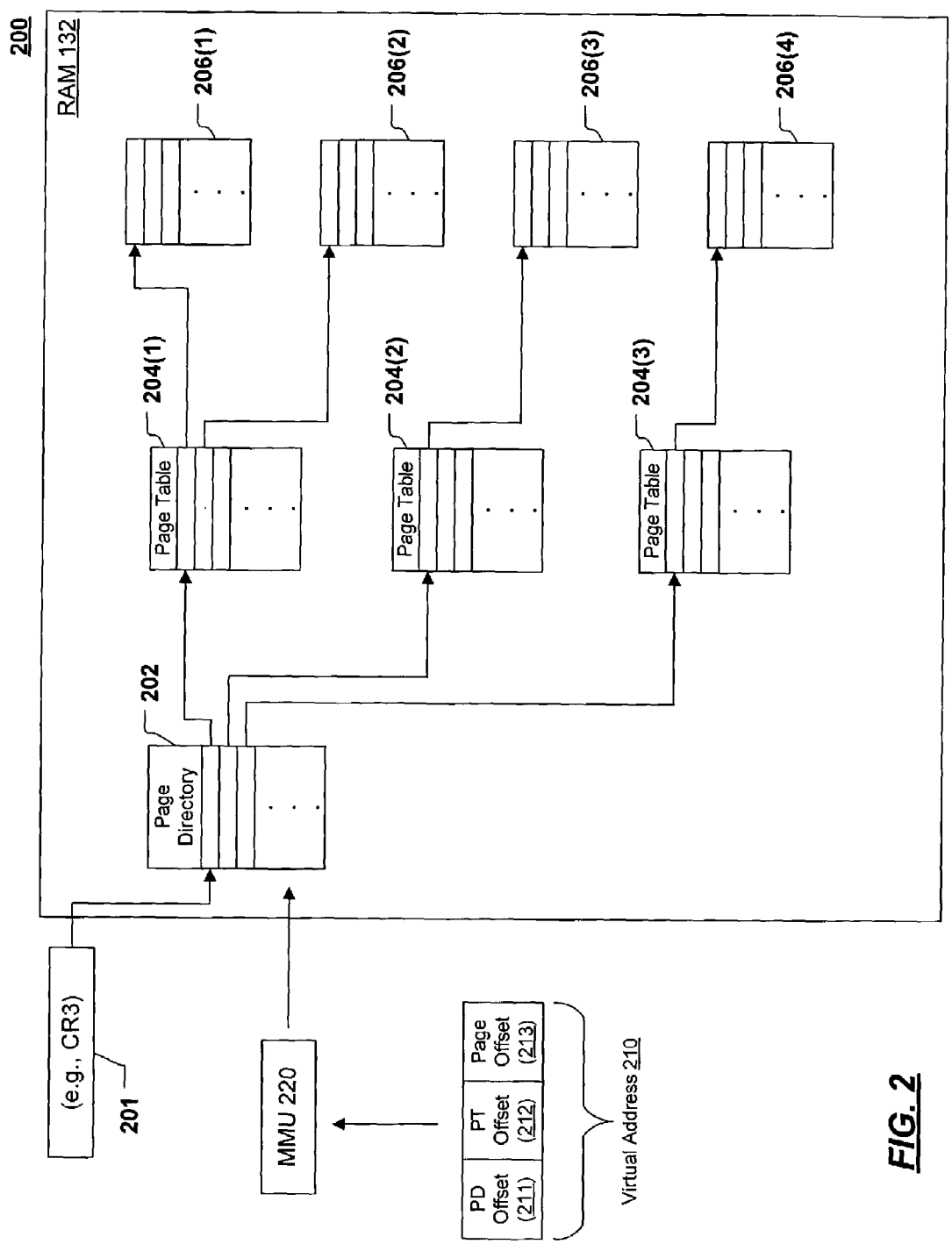
FIG. 2 is a block diagram of an exemplary virtual memory system that uses address translation maps to convert virtual addresses to physical addresses.

FIG. 2 shows an example of an exemplary virtual addressing system 200. System 200 is a type of virtual addressing system known as "page mapped virtual memory" or "paging." As is known in the art, there are various other virtual memory schemes, such as those based on segmentation. (The primary difference between paging and segmentation is that paging stores data in fixed-sized, contiguous portions of memory called "pages," where the low-order bits of the pages' physical addresses are aligned (e.g., each page may be 4096 bytes in length, and the zero-th byte of each page may have a physical address ending with 0×000). In segmentation, data is stored in "segments," which are of variable size and are not necessarily aligned.) While a page-based virtual memory scheme is shown in FIG. 2, it should be understood that the invention applies to systems that employ any type of virtual memory scheme.

In system 200, page directory 202 contains an array of entries. Each entry may contain a pointer to (i.e., physical base addresses of) a page table, such as page tables 204(1), 204(2), and 204(3). Each page table, in turn, contains an array of entries that may contain pointers to the base addresses of pages (e.g., pages 206(1), 206(2), 206(3), and 206(4)). Pages are fixed-length portions of RAM 132. It should be noted that the page directory and page tables themselves are also typically stored in pages of RAM. Typically, the system divides RAM 132 into pages, and assigns pages to store any type of data, whether the data is program data, or address translation mapping data, or any other kind of data. Thus, in system 200, the difference between page directory 202, page tables 204(1) through 204(3), and pages 206(1) through 206(4) has to do with the function of the data stored in these respective structures, rather than any structural or physical property of the memory—i.e., pages 206(1) through 206(4) may store program data, and the page directory and page tables store various levels of pointers leading to the program data. It should also be noted that, since page tables and page directories need to be read, and usually modified, during the operation of the program, the page tables may contain mappings leading recursively to themselves, or to the page directory, so that the page directory/tables can be read and/or written by virtual address.

In system 200, a byte on a page can be identified by a virtual address 210, comprising a page directory offset 211, a page table offset 212, and a page offset 213. Thus, in order to locate a physical address, a memory management unit (MMU) 220 (or other component that implements virtual addressing) uses page directory offset 211 to locate a particular entry in page directory 202—i.e., MMU 220 adds page directory offset 211 to the base address of page directory 202 in order to find an entry. (The method of finding the base address of page directory 202 is further discussed below.) The entry located contains a physical base address of a page table, so MMU 220 dereferences this address in order to locate one of the page tables (e.g., page table 204(1)). MMU 220 then uses page table offset 212 as an index into the identified page table, and retrieves the entry found at that offset. The entry is the physical base address of a page (e.g., page 206(1)), so MMU adds page offset 213 to the base address of the identified page in order to locate a particular byte of physical memory. Thus, by following the pointers and adding the specified offsets in the manner described above, MMU 220 uses the address translation map contains in page directory 202 and page tables 204(1) through 204(3) to convert virtual address 210 into a physical address. Since the address translation map is traversed in a hierarchical fashion, it is useful to think of the map as akin to tree, where the various structures in the map are "leaf" or "non-leaf." In the example of FIG. 2, page tables 204(1) through 204(3) are leaves, and page directory 202 is a non-leaf. (Strictly speaking the map is not a tree, since it may have cycles and/or cases where one node has two parents: i.e., since the page tables and page directories may have virtual addresses themselves, page tables may point to page tables or to the page directory. However, even where a page table contains pointers to pages in the map, the page table is still a leaf in the sense that it is the last portion of the structure that is dereferenced in the map before identifying the target physical address.)

Optionally, each of the entries in the page tables may include other information besides a pointer to a page. This information may include:

An attribute that indicates accessibility. Conventionally, pages can be marked "read/write" or "read-only." MMU 220 is configured to check the attribute as it dereferences the pointers in the page tables, and to raise an exception if an attempt is made to write a page that has been marked as read-only. In addition to the conventional choice of the read/write and read-only attributes, the invention optionally allows a page to be designated by an attribute called "page special." The "page special" attribute represents the special accessibility issues for pages that are part of an address translation map—i.e., that these pages should be writeable only under certain circumstances. In one embodiment of the invention, the page special attribute is the same as the read-only attribute. The use of the page special attribute is further discussed below.

A present/not-present indicator (which may also be called a valid/not-valid indicator). In general, each entry in a page table contains space to write a pointer to a page. However, some of the entries may contain memory garbage (i.e., the data contained in the entry does not really represent a mapping to a page), or they may have been filled with pointers to pages that have since been swapped to disk. Essentially, the present/not-present (or valid/not-valid) indicator tells MMU 220 whether the pointer data contained in an entry represents a page that actually exists in the memory. The MMU will not dereference a page table entry that has been marked as not-present (or not-valid).

System 200 also includes a storage location 201 that contains the base address of page directory 202. This storage location represents the entry point to the address translation map: every translation of a virtual address begins by dereferencing the pointer contained in storage location 201. MMU 220 uses this pointer to locate the page directory 202 when it begins to translate virtual address 210. (With reference to the leaf/non-leaf nomenclature, storage location 201 can be viewed as a non-leaf.) In the example of an INTEL x86 processor, storage location 201 corresponds to the register named CR3—that is, on an INTEL x86 processor, the register CR3 stores the physical base address of the page directory for the current context. Thus, it is possible to build alternative sets of translation tables (i.e., two or more sets of page directories and page tables), and to change which set of translation tables applies at a given point in time simply by writing the base address of a new page directory into storage location 201. One common use of this technique is for each process running on a computer to have its own page directory and page tables, where a "context switch" (i.e., an operation that, among other things, causes the virtual memory system to point to the address space of a new process) is performed by writing the base address of the new process's page directory into storage location 201. More generally, storage location 201 is a means for identifying which of several address translation maps is active, and storing a new value in storage location 201 is a technique for changing the active map by replacing the existing map with a new one. It should be understood that a pointer to the base address of a map is only one way of identifying the active map, and other systems may allow the active map to be identified or replaced in other ways. For example, the active map could be identified by a number stored in some register, where the number is something other than the base address of the relevant page map (e.g., an index into a table that contains base addresses of known page maps). The invention is not limited to systems that identify the active map by storing the map's base address in a register.

It should further be noted that FIG. 2 shows a mapping scheme that involves two levels of indirection—i.e., to find the physical location that corresponds to a virtual address, the MMU 210 must dereference a first pointer in the page directory, and then a second pointer in one of the page tables. However, other mapping schemes are possible. For example, there could be a one-level mapping scheme where pointers to all of the active pages are found in a single page table. Or, there could be a three-level mapping scheme where the address translator must work its way forward through three tables of pointer to find the target page. The architecture of the INTEL x86 processor supports one-, two-, and three-level paging schemes, although that processor is normally set to use the two-level scheme shown in FIG. 2. Other mapping schemes may have different numbers of levels (i.e., depths) within the same map, which works as long as there is some way to decide deterministically how deep to follow the map for any given virtual address. It should be emphasized that the mapping scheme shown in FIG. 2 is merely exemplary, and that the invention applies in any context in which virtual addresses can be mapped to physical memory locations.

Computer System with Trusted and Untrusted Environments

The invention seeks to implement an isolated or curtained memory by creating and maintaining a condition in which certain processes (e.g., those whose trustworthy behavior has not been established) cannot use virtual addresses to access the curtained memory. Since memory isolation is dependent on the currently-active address translation map not pointing to isolated memory, the memory isolation provided by the invention is only effective to the extent that one can be assured that operations having the potential to affect the map are evaluated and, if necessary, blocked.

These functions can be performed reliably within a system that has both trusted and untrusted environments. In such a system, all operations that have the potential to affect address translation maps used by the untrusted environment are performed either within the trusted environment, or, at least, by some component that has been deemed sufficiently trustworthy.

In the trusted environment, there are severe limitations on what code is permitted to execute. For example, the trusted environment may require that only code that has been certified as trustworthy be permitted to execute in the trusted environment, and may authenticate such code before permitting it to execute. The processor may provide instructions that can only be executed in the trusted environment. The untrusted environment, on the other hand, is similar to the environment typically created by the operating system on an "open" computing system (e.g., a personal computer, a handheld computer, etc.)—i.e., nearly any code is permitted to execute in such an untrusted environment. When trusted and untrusted environments exist side-by-side in the same computer system, the trusted environment may take steps to ensure that its trustworthiness cannot be affected by anything that happens in the untrusted environment.

FIG. 3 shows a model of trusted and untrusted environments existing within the same computer system. In the example of FIG. 3, a single computer system has both an untrusted environment 310, and a trusted environment 320. The principle distinction between untrusted environment 310 and trusted environment 320 is this: In untrusted environment 310, more or less any code is permitted to execute, but the system will not give the code access to certain resources that are reserved only for the trusted environment. In trusted environment 320, executing code has access to the resources reserved for the trusted environment, but only certain trusted code modules are permitted to execute. The invention is not limited to any particular method of establishing the trustworthiness of an application or other code module. As one non-limiting example, a trusted application or code module could carry a certificate indicating that a trusted verifier has determined the application will behave according to some standard, where the certificate can be cryptographically authenticated.

Untrusted environment 310 and trusted environment 320 can be further divided into sub-environments. For example, untrusted environment 310 can be divided into an untrusted user mode 311 (where ordinary applications execute), and an untrusted kernel mode 312 (where the ordinary operating system executes). Similarly, trusted environment 320 can be divided into a trusted user mode 321 (where special, trusted applications execute) and a trusted kernel mode 322 (where the trusted operating system executes that creates the trusted environment for trusted applications).

The system depicted in FIG. 3 can be configured such that attempts to change the address translation tables that arise in untrusted environment 310 trigger an evaluation by trusted environment 320 before they are allowed to proceed. Thus, a trusted component in trusted environment 320 (e.g., trusted code that executes in the trusted environment, or, perhaps, some type of trusted function that is built into the processor itself, and thus forms part of the trusted environment) is given the chance to evaluate the attempted change and to decide whether the attempted change should be allowed to occur. The type of components that can be used in trusted environment 320 to evaluate address translation map changes are discussed below. However, regardless of the form that these components assume (e.g., software, hardware, firmware, etc.), a key feature of any such component is that it will not allow the map to be affected in any way that would result in allowing a virtual address to isolated memory to be visible to untrusted code.

At this point, the relationship between isolated memory and a trusted environment should be explained. "Isolated" or "curtained" memory is a memory to which access is disallowed in at least some context; a "trusted environment" is an environment in which only trusted components are allowed to operate. The trusted environment is a means to implement an isolated memory, since the trusted nature of the environment provides some degree of assurance that the enforcement mechanism will not be compromised. Moreover, a trusted environment typically has a private data space that is not usable outside of the trusted environment, and the memory isolation techniques provided herein are effective ways to implement this private data space. Thus, trusted environment can be used to implement memory isolation, and can also make use of an isolated memory.

However, it should be noted that trusted environment and isolated memory are separate concepts. It is possible for memory to be isolated without being associated with a trusted environment, and it is possible to perform the memory isolation techniques provided herein without a trusted environment. For example, it is possible to "isolate" a portion of the untrusted environment's memory in the sense that untrusted process A would be permitted to access that portion of memory, but untrusted process B would not. Moreover, it is possible to use the techniques provided herein to enforce the isolation of a portion of memory without using a trusted environment, although there is a greater risk that an enforcement mechanism operating outside of a trusted environment would be compromised, which increases the chance that the memory isolation is not truly being enforced. Thus, isolated memory and a trusted environment complement each other in a sense, but are not the same thing. As a practical matter, it would be nearly impossible to have a meaningful trusted environment (i.e., one in which a trusted program could be guaranteed to remain uncompromised long enough to execute) without having an isolated memory to store that program's code and data.

Classifying Memory Portions

For the purpose of the invention, it is convenient to classify memory as belonging to one or more sets. These sets are:

Set T: The set of memory pages that contain, or are available to contain, trusted data. This is the set of pages that will form the isolated or curtained memory, since they cannot be accessed by untrusted sources.

Set P: The set of memory pages in which page maps (or, more generally, address translation maps) are contained. In the example of FIG. 2, page directory 202 and page tables 204(1) through 204(3) are members of P. It should be noted that membership in P is not limited to the active page map, such as the map shown in FIG. 2, but includes all of the pages used for any page map, on any CPU, within a system.

Set R: The set of "root" pages for the page maps. This is the set of pages whose base addresses can be loaded into storage location 201 (e.g., the CR3 register). In the example of FIG. 2, page directory 202 is a member of R. It will further be noted that $R \subset P$.

Set D: The set of pages to which the invention prohibits direct access by an untrusted hardware source. As further discussed below, in a preferred embodiment, $D = T \cup P$. It should be noted that pages containing representations of sets T, P, R, and D are, themselves, members of T. Since the address translation control system makes use of these sets in order to determine which memory accesses are allowable, it is important that the representations of these sets not be accessible to the untrusted environment; hence, representations of these sets are members of T.

It should further be noted that the reason the set D (=T∪P) is maintained is to make explicit the idea that the address translation control algorithms naturally emit the set of pages that must be protected from untrusted hardware (e.g., DMA engines, non-participating processors, and so on.) So the existence of set D is about communicating with hardware that protects memory from untrusted hardware entities (and the software in them.)

It should be noted that, while T, P, R, and D have been defined above with reference to page-based memory, these definitions have analogues in any memory scheme. For example, T, P, R, and D could be lists of segments (e.g., identified by their segment numbers, or could be lists of pages as spanned by segments, or could have elements that are segment number-segment length-segment base tuples). In theory, membership in T, P, R, and D, can be assigned on a per-location (e.g., per-byte, per-word, etc.) basis, although the task of tracking membership in the sets at such a fine level of granularity would be quite complex and resource-intensive. Tracking membership in the sets is greatly simplified in a page- or segment-based system, since large blocks of memory can be completely identified by their base address or segment number. However, it should be emphasized that the invention is not limited to systems that employ any particular method of organizing the memory.

The invention tracks membership in T, P, R, and D, and treats access requests differently depending on which set the target address is a member of. The process of evaluating various types of access requests is discussed below. However, in general, the invention:

Prevents untrusted sources from reading or writing pages in T;

Prevents untrusted sources from writing pages in P (or R) directly, but rather calls upon a trusted component to evaluate the write request and to carry out the write on behalf of the untrusted source if certain conditions are met. In particular the trusted component will allow the request if carrying out the request will not cause the address translation map contained in P to point to a member of T, and will not cause the translation map contained in P to offer a writeable pointer to P itself.

Allows only the base addresses of pages that are members of R to be loaded into storage location 201. (When a new map is activated by an untrusted source for the first time, it is verified to ensure that it does not point to any member of T, and that it does not provide any writeable mapping to itself, or any other member of P. If this condition is satisfied, then the base address of the new map's page directory may be loaded into storage location 201, and that base address will be added to R so that future loads can proceed without re-evaluating the map.)

There are various techniques for tracking membership in T, P, R, and D, that may be used. For example, a system according to the invention can store a vector representing each of these four sets, where each page is represented by one bit of the vector. For example, if there are $2^{15}$ pages of memory, then a 4 Kbytes vector can be used to represent each page's membership in one of the sets (since there are $2^{15}$ bits in 4 Kbytes), where each bit in the vector is turned on or off depending on whether the page that corresponds to the bit is a member of the set. Each one of the sets can have it's own vector that describes, at any given time, the current membership in the set. The use of such vectors is a convenient technique for representing pages' membership in sets; however, it should be understood that there are various ways to represent such membership, and the invention is not limited to the technique for representing set membership.

Processes for Maintaining and Creating Isolated Memory

Figure 4:
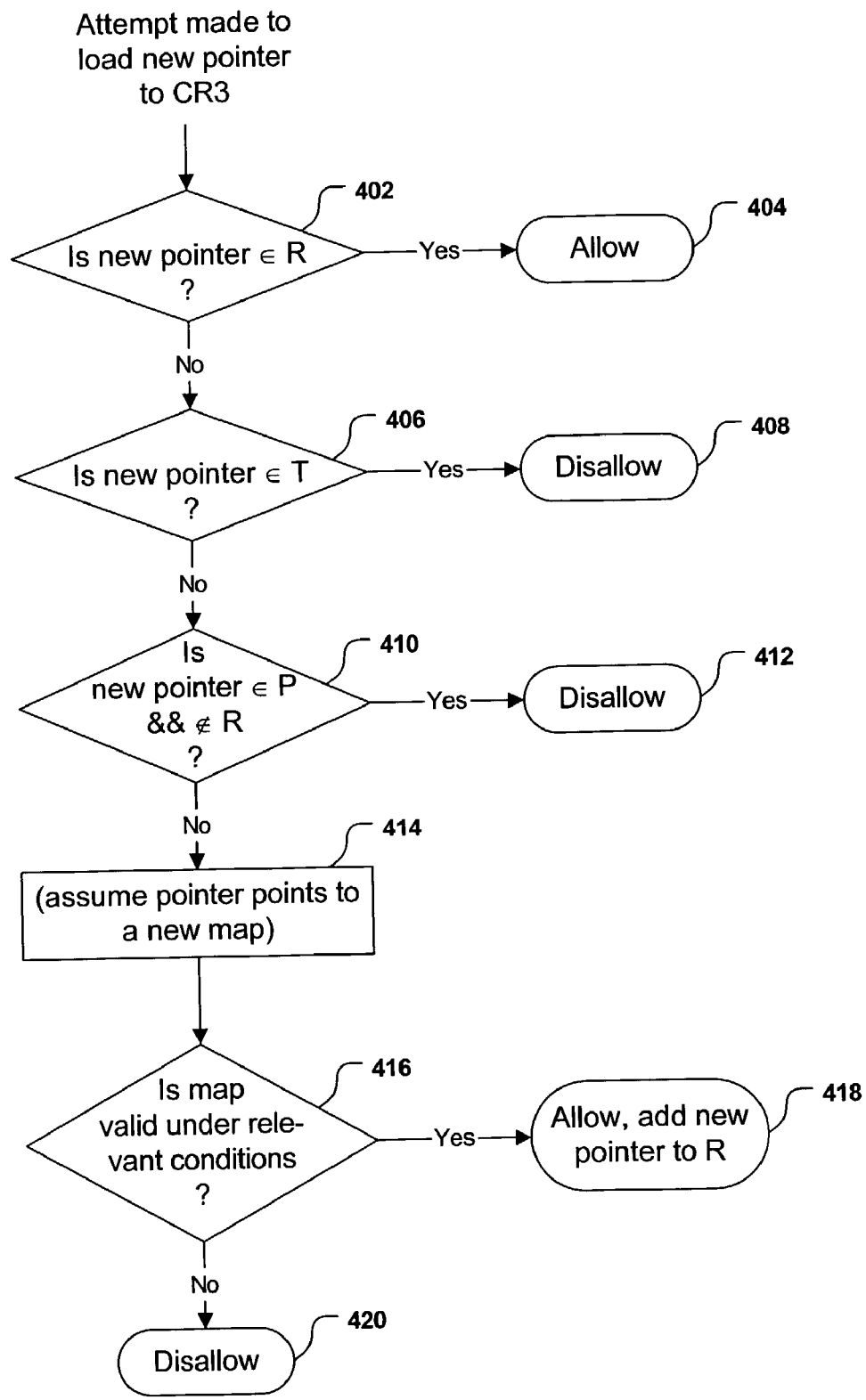
FIG. 4 is a flow diagram of an exemplary process for evaluating a request to replace the active address translation map with a new map.
Figure 5:
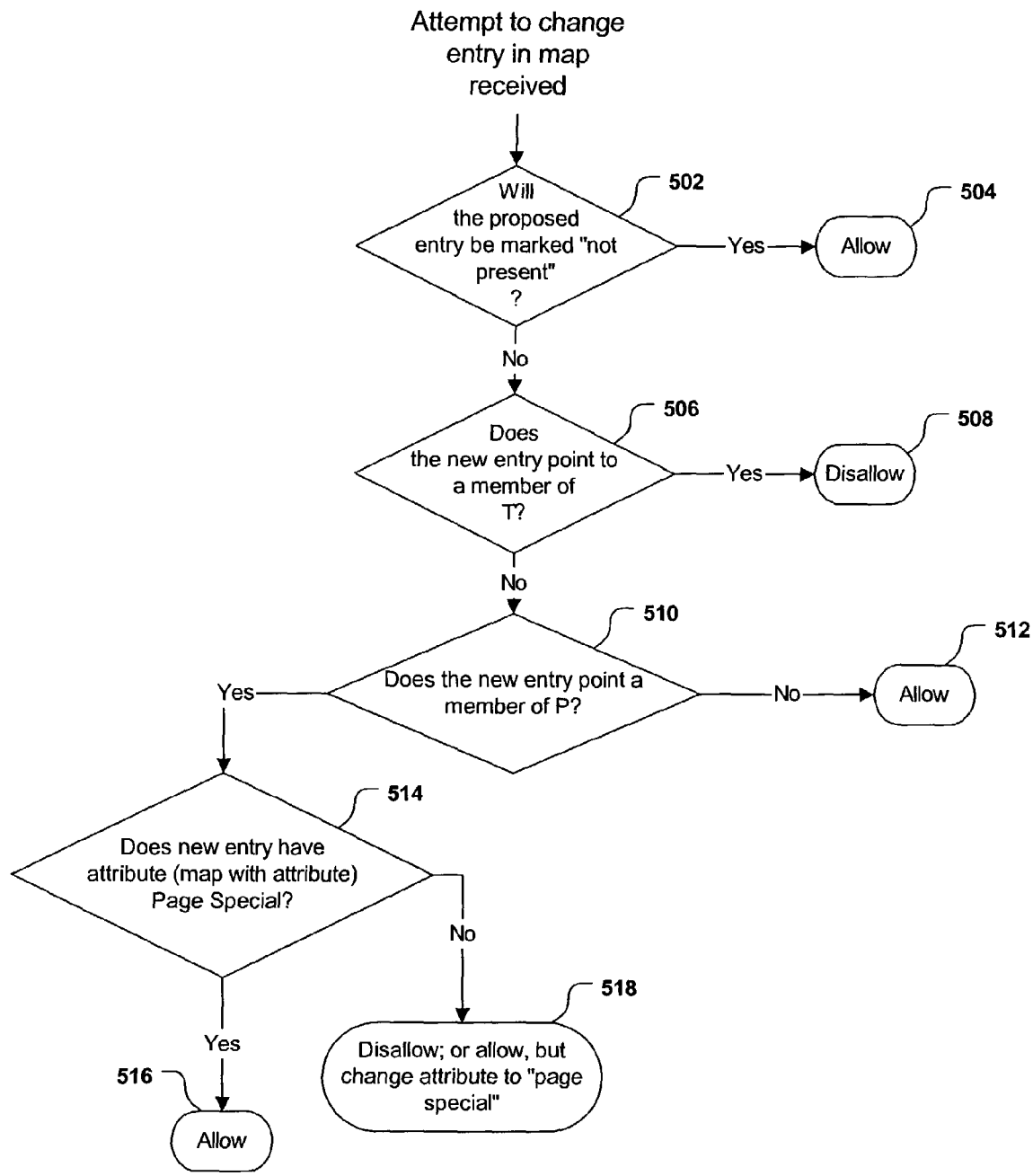
FIG. 5 is a flow diagram of an exemplary process for evaluation a request to edit an entry in an address translation map.
Figure 6:
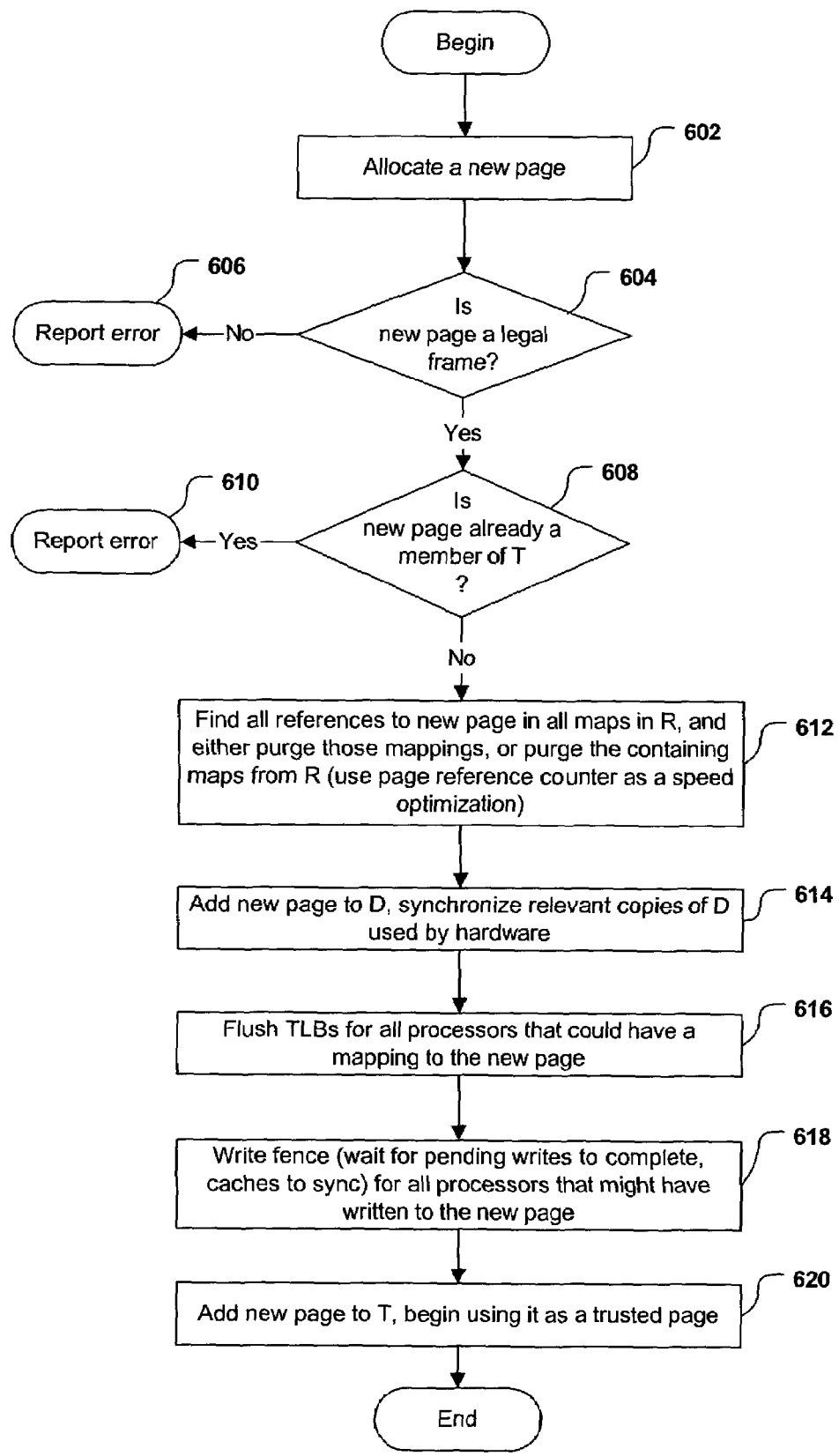
FIG. 6 is a flow diagram of an exemplary process for seizing portions of memory to become part of the isolated memory.

As noted above, the invention enforces memory isolation by controlling the content of the address translation maps such that maps that are active in the untrusted environment do not point to trusted memory. FIGS. 4–6 show exemplary processes for enforcing memory isolation in this matter. FIG. 4 shows a process for determining whether a new map can be activated. (It will be understood that the activation of a new map is an event that needs to be controlled by the mechanism that enforces memory isolation, since the new map might contain pointers to isolated memory.) FIG. 5 shows a process for determining whether a change to an entry in the map can be permitted. FIG. 6 shows a process for seizing a page to become part of the trusted memory.

Exemplary Process for Evaluating a Request to Activate a New Map

FIG. 4 shows an exemplary process for evaluating whether a new address translation map may be activated. The example of FIG. 4 assumes that a new address translation map is activated by writing a pointer to the map's base address into a defined storage location (e.g., storage location 201 shown in FIG. 2). However, it will be understood that the invention is not limited to the situation where address translation maps are activated in this manner, and that the process of FIG. 4 can be applied to any system that allows the currently-active address translation map to be replaced with another map.

When an attempt to write a new pointer to the storage location, the new pointer is compared to set R to determine if the pointer is a member of R (block 402). If the new pointer is a member of R, then the request is allowed (block 404), and the new pointer is written to storage location 201.

If the new pointer is not a member of R, then the pointer is compared to set T to determine if it is a member of T (block 406). If the pointer is a member of T, then the request is disallowed (block 408), since the address translation map (including the entry point of the map that is stored in storage location 201) is not allowed to point to a member of T.

If the pointer is not a member of T, then the pointer is next compared to sets P and R to determine whether the new pointer is a member of P, but not a member of R (block 410). As noted above, R is a subset of P, but storage location 201 is only allowed to point to pages that are in R. Thus, if the new pointer is a member of P but not of R, then the request is disallowed (block 412). Since the pointer's non-membership in R has already been determined at step 402, it is not necessary to test explicitly for membership in R at step 410.

If the process has not been terminated by any of the conditions in steps 402, 406, and 410, then the new pointer is not a member of either T, P, or R, so it is assumed (block 414) that the new pointer that that the system is attempting to load into storage location 201 is the base address of a new address translation map that has not yet been evaluated to ensure that it is a legitimate map. The map referenced by the new pointer is then evaluated under various constraints to ensure that it will not violate the conditions that enable memory isolation (block 416). If the map satisfies the relevant constraints, then the request to load the new pointer is allowed, and the new pointer is added to R (block 418) so that future requests to load this pointer can be decided more quickly at step 402. If the map does not satisfy the relevant constraints, the request to load the new pointer is disallowed (block 420). The "relevant constraints" under which the map is tested preferably include:

No entry in a page directory or page table may point to a member of T;

Any page that points to a page table, page directory, or storage location 201, or that contains a leaf mapping, must have its access attribute set to "page special" (that is, there are no writeable virtual addresses that map to pages in P);

Any valid entry in a non-leaf structure of the address translation map (e.g., in the example of FIG. 2, storage location 201 and page directory 202 are the "non-leaves") must point to a member of P. (I.e., non-leaf structures should only point to other parts of the page map. It should be noted that in some architectures, such as on the INTEL x86 processor, it is possible for some entries in the page directory to point to data pages rather than page tables, even if other entries point to page tables. Thus, while FIG. 2 shows every page directory as being wholly a non-leaf structure, it is possible to define the concept of leaf/non-leaf on a per-entry basis rather than a per-directory/per-table basis.)

These rules will ensure that the new address translation map will behave in an expected manner and will not allow code in the untrusted environment to address members of T.

Exemplary Process for Evaluating a Request to Edit a Map Entry

FIG. 5 shows an exemplary process for evaluating a request to edit an entry in a page map. First, if the proposed edit will result in the entry being marked "not present" or "invalid" (determined at step 502), then the edit can be allowed (block 504). The reason such an edit can be allowed without further evaluation is that the edit will not, in effect, cause a member of T to have a virtual address, since marking the entry "not present" or "invalid" means that the address translator (e.g., MMU 220, shown in FIG. 2) will not follow the pointer contained in the entry.

If the proposed edit will result in the entry being marked "present" or "valid" (either by keeping an existing "present" or "valid" setting in the entry, or by changing a "not present" or "invalid" entry to "present" or "valid"), then the proposed edit is evaluated to determine whether it will cause the entry to point to a member of T (block 506). If the proposed edit will cause the entry to point to a member of T, then the request is disallowed (block 508).

If the proposed edit will not cause the entry to point to a member of T, then it is determined (block 510) whether the proposed edit will cause the entry to point to a member of P. If the pointer to be written to the entry is not a member of P, then the request is allowed (block 512). If the pointer to be written is a member of P, and the target page pointed to by the pointer has the access attribute "page special" (determined at step 514), then the edit is allowed (block 516). If the attribute of the target page is not set to "page special," then the edit is either disallowed, or else the edit is allowed while changing the attribute of the target page to "page special" (block 518).

Exemplary Process for Seizing a New Page for Trusted Memory

FIG. 6 shows an exemplary process of seizing a new page of isolated memory. The process of FIG. 6 takes a page of memory from the general pool of pages and claims it for future use as part of the isolated memory.

First, a new page of memory is allocated (block 602). The new page is first checked to determine that it is a legal frame for the relevant hardware (block 604), and that it is not already a member of T (block 608). (If either of the conditions in blocks 604 and 608 are false, then an error is reported at blocks 606 or 610, respectively, and the seizing process is restarted.)

After the allocated page has passed the tests at blocks 604 and 608, all page maps that are members of R are searched for references to the new page, and any such references are purged (block 612). Preferably, a page reference counter is maintained showing how many existing references there are to a given page. The page reference counter speeds up the process of purging all references to the newly seized page, since it can be determined when all such references have been purged without having to evaluate every entry in every map. The new page is then added to D (and the update is synchronized with the copies of D used by the relevant hardware to prevent direct memory access) (block 614). The TLBs for all processors that could possibly have a mapping to the newly-seized page are then flushed (or, at least, the mappings to the seized page are removed from the TLB) (block 616). Additionally, the seizing process waits for all pending writes to complete (and for the relevant caches to sync) from all processors that might have written to the newly-seized page (block 618).

Following the completion of step 618 and preceding steps, it is known with assurance that there are no mappings to the seized page exposed to the untrusted environment, and that no actions taken by untrusted components (e.g., pending writes, for which completion was awaited at step 618) can affect the newly-seized page. Thus, at this point the newly-seized page is added to set T, so that the system may begin using it as a trusted page (block 620).

After the process of FIG. 6 has been completed, a new page has been seized for use in isolated memory. It should be noted that, while the process of FIG. 6 is described in terms of seizing pages, it should be understood that the process can be applied to any type of memory unit (e.g., segments), and is not limited to systems that organize memory into pages. It should further be understood that the process described herein can be used to seize groups of pages at one time, which is preferable for efficiency reasons.

Using the Trusted Environment to Control Editing of Address Translation Data

Figure 7:
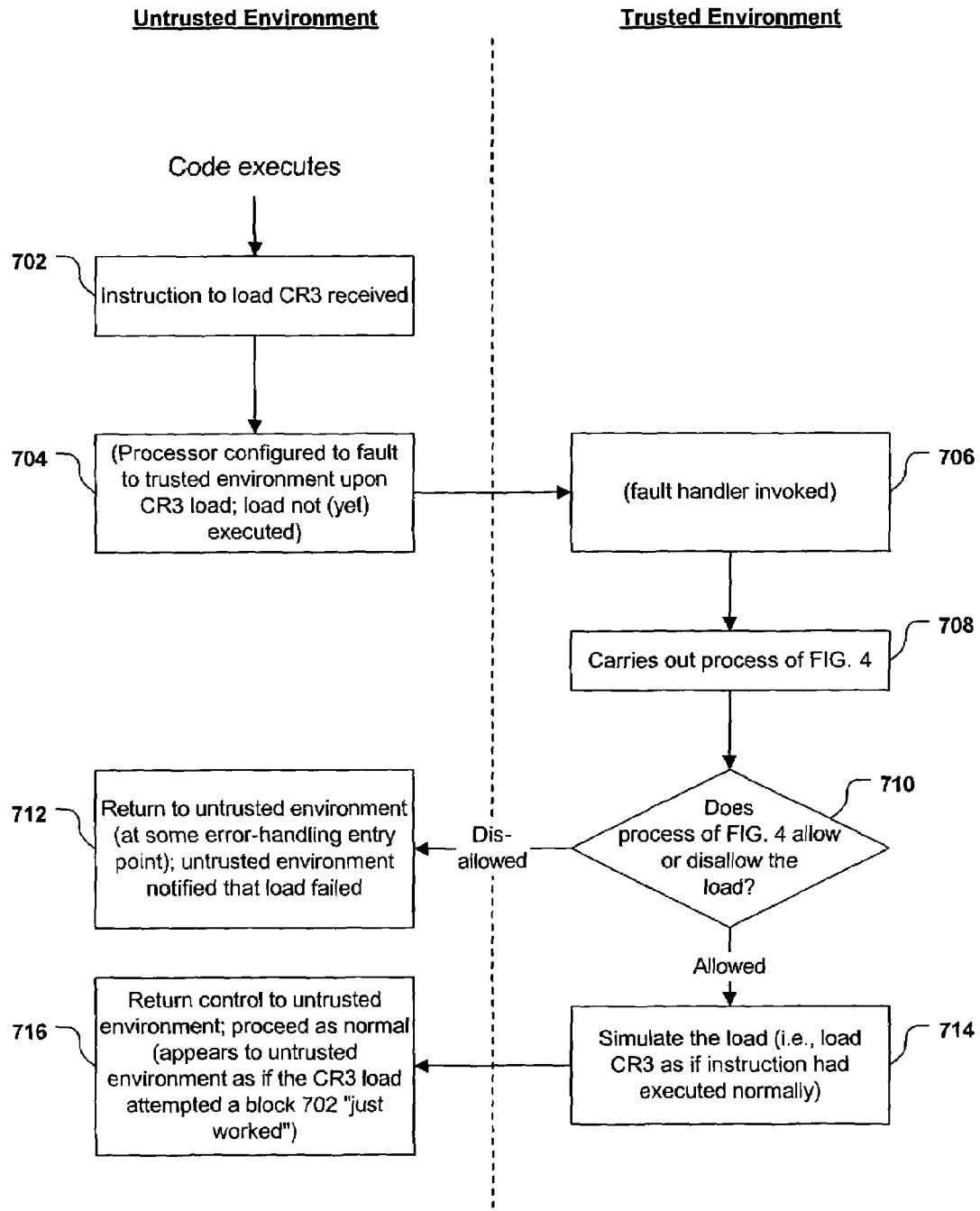
FIG. 7 is a flow diagram of an exemplary process whereby a request to activate a new address translation map is received in the untrusted environment and evaluated in the trusted environment.
Figure 8:
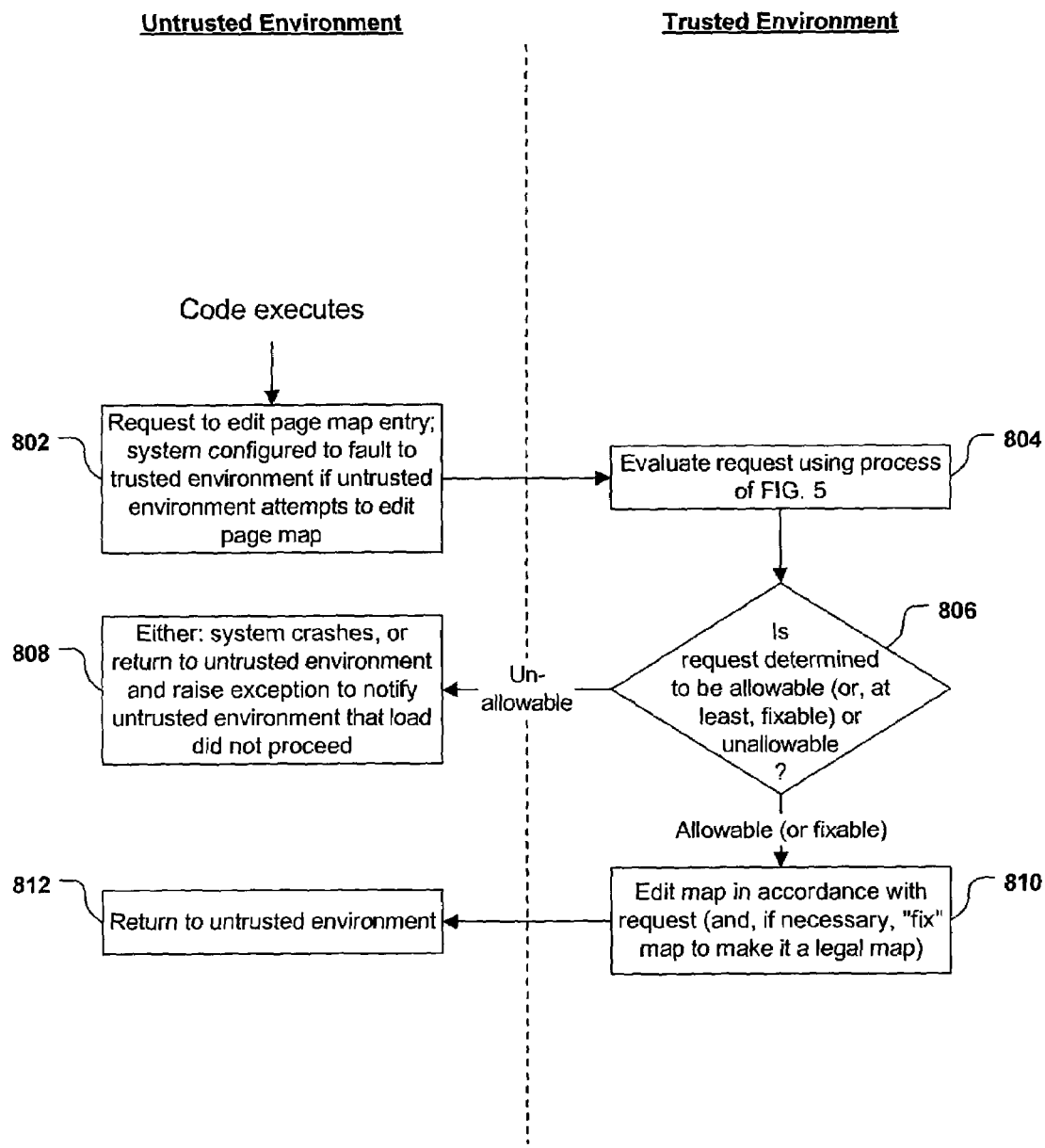
FIG. 8 is a flow diagram of an exemplary process whereby a request to edit an address translation map is received in the untrusted environment and evaluated in the trusted environment.

As discussed above, the invention creates and maintains an isolated memory by ensuring that untrusted code cannot use an address translation map that points to isolated memory. As further discussed above, since the isolation of a portion of memory depends on the address translation map not being modified in a way that would point to isolated memory, operations that affect the map are preferably performed by a trusted component in the trusted environment. FIGS. 7 and 8 show exemplary processes in which the trusted environment evaluates and controls changes to the map that arise out of the untrusted environment. In general, operations that affect the map—either changes to a map, or the activation of a new map—should be performed in the trusted environment, even when those operations arise out of the untrusted environment.

FIG. 7 shows an exemplary process in which a request to activate a new map arises in the untrusted environment, and is evaluated in the trusted environment. (It should be understood that activating a new map is, essentially, a type of map change; the entire map is changed by replacing it with a new map, and thus activation of a new map carries the same potential to breach the memory isolation as does the editing of a single entry.)

At the outset of the process, some code (e.g., an application program, the untrusted operating system, etc.) is executing normally in the untrusted environment. At some point, an instruction is received to load a new value into the CR3 register (block 702). For example, the (untrusted) operating system may switch execution from one process to another, and thus may be activating the new process's page map. The processor, in this example, has been configured to fault to the trusted environment when an attempt is made to load the CR3 register (as indicated by block 704). Preferably, the CPU has been configured to check whether the value to be loaded is a member of R, and to allow the load without faulting if the value is a member of R. However, if the value to be loaded is not a member of R, then the load instruction is not actually executed, but rather control is passed to the trusted environment, and a fault handler is invoked (block 706). When the fault handler is invoked, a process (such as that shown in FIG. 4) is carried out to determine whether the load instruction that was received at step 702 may proceed (block 708). The fault handler may contain code to carry out the process of FIG. 4 (except for testing for membership in R at step 420, if that test has already been carried out prior to the fault), or else the fault handler may invoke some separate trusted agent that carries out that process; in either case, the evaluation described in FIG. 4 is carried out on in the trusted environment.

At step 710, the process of FIG. 7 branches depending on whether step 708 indicates that the load is allowed or disallowed. If the load is disallowed, then control over the system is returned to the untrusted environment without the load having been performed (block 712). The trusted environment may, at this time, inform the untrusted environment that the load was disallowed and did not take place. On the other hand, if the load is allowed, then the register is loaded with the value that the untrusted environment attempted to load at step 702. Typically, load is "simulated" by the trusted environment, using some sequence of instructions so that it appears to the untrusted environment as if the load executed normally. The mechanics of how the processor is instructed to load CR3 are not important, as long as, when control is returned to the untrusted environment, the CR3 register contains the value that it would have if the load instruction received at step 702 had been able to proceed without further evaluation. After the load has been performed, control over the system returns to the untrusted environment, and normal execution of untrusted code resumes.

It should be noted that the process of FIG. 7 has been described in terms of the INTEL x86 processor, wherein a new address translation map is activated by loading the CR3 register. However, the invention is not limited to the INTEL x86 processor, but may be applied in any environment. In greater generality, whenever an attempt is made to activate a new address translation map, the system may call upon the trusted environment to evaluate the request, and to carry it out or abort it as necessary. The technique of having the trusted environment evaluate a request to activate a new map is not limited to systems that activate a new map by loading an address into the CR3 register.

FIG. 8 shows an exemplary process in which a request to edit an address translation map is received in the untrusted environment, and evaluated in the trusted environment. At the outset of the process, some code in the untrusted environment is executing normally. At some point during the execution of such code, an instruction to edit an address translation map is received (block 802). In the example of FIG. 8, the system has been configured to call upon the trusted environment to evaluate such requests when they are made. There are various ways in which the system can be configured to call upon the trusted environment; some of these ways are discussed below, although it should be understood that the invention is not limited to any particular method of notifying the trusted environment of a map edit. In prefered embodiments the edit is not allowed to proceed until the edit has been evaluated for allowability using a process such as that shown in FIG. 5 (block 804). However, hardware could be designed that could instead enforce a rule that the edit can not become usable or visible to any untrusted consumer of the map (hardware or software) until it has been approved by an evaluation like that of FIG. 5, and that if such an evaluation fails, the edit can be reliably backed out and undone, without any untrusted consumer ever knowing about it. The process then branches depending on whether the request is allowed or disallowed (block 806). If the request is disallowed, then control over the system returns to the untrusted environment, and the untrusted environment may be notified that the request to edit the map did not proceed (block 808). On the other hand, if the request is allowed, then the map is edited by code that executes in the trusted environment (block 810), and then control is returned to the untrusted environment (block 812).

As noted above, there are various ways to configure a system to notify the trusted environment of a map edit. As long as the system can recognize a page map page at the time an access request is received (e.g., using the "page special" attribute, as described above), the system will know when it needs to fault to, or otherwise communicate with, the trusted environment regarding the map edit. There are several ways to configure the system to use the "page special" attribute including, but not limited to:

- Design the processor's hardware logic such that the write instruction checks the attribute of the target page. If the attribute is "page special," then the hardware evaluates the change (e.g., using the process of FIG. 5). If the write would fail because the evaluation determines that the write is not allowable, than an exception (e.g., "PageControlTrap") can be raised to notify the process that issued the write instruction that the write will not be carried out. When this technique is used, the logic circuitry that implements the write instruction essentially becomes part of the trusted environment, since it is this logic (which cannot be changed by the untrusted environment) that is used to enforce the constraints on editing the address translation map.
- Define a new instruction (called, for example, "WritePMe" for ("Write Page Map Entry") that is used to write to pages whose attribute is "page special," and configure the ordinary write instruction to disallow all writes to pages that have the "page special" attribute. In this case, the evaluation of the edit (e.g., the evaluation shown in FIG. 5) is performed by hardware logic associated with the WritePMe instruction (and this hardware logic is effectively part of the trusted environment, since it cannot be changed or otherwise affected by anything that happens in the trusted environment).
- Make "page special" be the existing "read-only" attribute. As is known in the art, all attempts to write pages that have the read-only attribute generate a fault. The fault handler can be a trusted software module that executes in the trusted environment, where the fault handler performs or invokes an evaluation process such as that shown in FIG. 5. In addition to using the "page special" attribute to identify pages/segments that are part of the address translation map, the system may also be configured to store map components in a defined area of virtual memory—e.g., at virtual addresses within some defined numerical range—and pages that are part of the map can then be identified based on whether their addresses fall within this range. If the system has been configured to recognize portion of the map in this manner, then the techniques described above in connection with the page special attribute (e.g., building address translation control into a write instruction, or faulting when attempts to edit the page map are recognized) can be implemented in the same manner as described above. The only difference is that attempts to edit the page map are detected based on the target address of the write falling into a specified range, rather than based on the target address being marked "page special."

One observation that can be gleaned from the foregoing discussion is that, in a preferred embodiment, the invention never allows the untrusted environment to perform a direct write of memory in P, or any access of memory in T. Thus, as noted above, the set D (i.e., pages for direct access by the untrusted hardware environment—such as DMA engines—is not allowed) is equal to the union of P and T.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. In particular, while the invention has been described with reference to implementing isolated memory for a trusted environment, it should be understood that the techniques described herein can be used in any context wherein control over memory is desirable. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A method of controlling memory usage in a system that comprises a plurality of memory locations, some of the memory locations being designated to be accessible only by a trusted source, each of the memory locations having a physical address, the system supporting the use of virtual addresses to address the memory locations, the memory location that corresponds at a given point in time to a given virtual address being at least partly determined by a selectable group of address translation data that is storable in the memory locations, the system further comprising a writeable storage location that contains, at any given point in time, a pointer to the particular group of address translation data that has been selected to partly determine which of the memory locations corresponds to a given virtual address, the method comprising:

receiving a request to write a new pointer into the storage location;

determining that loading the new pointer into the storage location will not cause any of the memory locations that are designated to be accessible only by the trusted source to correspond to any virtual address; and allowing the request to proceed.

2. The method of claim 1, wherein the system comprises a processor that operates in at least two modes, the processor operating in a first of the modes when untrusted operations are performed and operating in a second of the two modes when trusted operations are performed, wherein the request is in the form of a first executable instruction to write a datum to the storage location and is received while the processor is operating in the first mode, and wherein the method further comprises:

in response to receiving the request, changing control of the processor to the second mode prior to executing the instruction, whereby said determining act is performed while the processor is operating in the second mode.

3. The method of claim 2, wherein the allowing act comprises:

in the second mode, carrying out the request by either executing the first executable instruction or executing one or more second executable instructions whose result is to write the datum to the storage location.

4. The method of claim 1, wherein the system comprises a processor that is compatible or upwardly compatible with the INTEL x86 processor architecture, and wherein the storage location comprises the processor's CR3 register.

5. The method of claim 1, further comprising:
maintaining a set of values that can be written to said storage location;
and wherein said determining act comprises:
determining that said new pointer is included in said set of values.

6. The method of claim 5, wherein the selectable group of address translation data is selected from a plurality of groups of address translation data, each of the groups having a base address associated therewith, wherein the set of values that can be written to said storage location comprises the base addresses of all of the groups, and wherein the act of determining that said new pointer is included in said set of values comprises determining that the new pointer is the base address of one of the groups.

7. The method of claim 1, wherein the selectable group of address translation data is selected from a plurality of groups of address translation data, each of the groups having an identifier associated therewith, and wherein the act of determining that the new pointer will not cause any of the memory locations that are designated to be accessible only by the trusted source to correspond to any virtual address comprises determining that a set of approved identifiers includes the identifiers associated with the group of address translation data pointed to by the new pointer.

8. The method of claim 1, wherein each group of address translation data comprises:
a page directory comprising a plurality of directory entries, the page directory having a base address associated therewith, each directory entry being identifiable relative to the base address; and
one or more page tables, each of the page tables having a table address, each of the page tables comprising a plurality of page table entries, each of the page table entries being identifiable relative to the table address of the page table of which the page table entry is a member, each of the directory entries containing the table address of one of the page tables, each of the page table entries containing the physical address of one of the memory locations.

9. The method of claim 8, further comprising:
determining that none of the directory entries or table entries in the group of address translation data pointed to by the new pointer points to a memory location that has been designated to be accessible only to a trusted source.

10. The method of claim 8, further comprising:
determining that none of the directory entries in the group of address translation data pointed to by the new pointer contains a valid pointer to any memory location that is not a base address of either a page directory or a page table.

11. The method of claim 8, wherein the plurality of memory locations are organized into pages, each page having an attribute associated therewith which indicates accessibility of the page, each page's attribute being selected from a plurality of attributes, each of the page directories and page tables being stored in one of the pages, and wherein the method further comprises:
determining that at least the pages that store page tables or page directories and that are also pointed to by a valid entry in the group of address translation data pointed to by the new pointer are associated with a first one of the plurality of attributes.

12. The method of claim 1, wherein the new pointer identifies a first of the groups of address translation data, and wherein the determining act comprises:
determining that the first group of address translation data contains a mapping to at least one of the memory locations that are designated to be accessible only by the trusted source; and
changing at least one bit in the first group of address translation data so that the first group of address translation data does not contain a mapping to any of the memory locations that are designated to be accessible only by the trusted source.

13. The method of claim 12, wherein the act of changing at least one bit comprises marking an entry in the first group of address translation data as not present.

14. The method of claim 1, where there are virtual addresses corresponding to the group of address translation data pointed to by the new pointer, and wherein the method further comprises:
determining that the virtual addresses for the group of address translation data pointed to by the new pointer are within a predefined category of virtual addresses.

15. The method of claim 14, wherein the predefined category comprises a numerical range of virtual addresses having upper and lower limits.

16. A method of controlling memory usage in a system that comprises a plurality of memory locations, each of the memory locations having a physical address, the system supporting the use of virtual addresses to address the memory locations, the memory location that corresponds at a given point in time to a given virtual address being at least partly determined by modifiable address translation data that are storable in the plurality of memory locations, some of the memory locations being designated to be accessible only by a trusted source, the method comprising:
receiving from a first source a request to write a datum to a first of the memory locations, the first source being different from the trusted source;
determining that carrying out the request will not cause the address translation data to be modified in a manner that causes any of the memory locations that are designated to be accessible only by the trusted source to correspond to any virtual address; and
allowing the request to proceed.

17. The method of claim 16, wherein there virtual addresses for the modifiable address translation data, and wherein the method further comprises:
determining that the virtual addresses for the modifiable address translation data fall within a predefined category of virtual addresses.

18. The method of claim 17, further comprising:
determining that carrying out the request will not cause the virtual addresses of any of the modifiable address translation data to fall outside of a specified range.

19. The method of claim 17, wherein the predefined category comprises a numerical range of virtual addresses having upper and lower limits.

20. The method of claim 16, further comprising:
determining that the modifiable address translation data map one or more defined virtual addresses to one or more defined memory regions.

21. The method of claim 16, wherein the memory locations are grouped into one or more pages, each of said pages comprising an equal number of memory locations, wherein the address translation data comprises one or more page tables, each page table comprising pointers to one or more of the pages, wherein a first set of one or more pages comprises the one or more memory locations that are designated as being accessible only by a trusted source, and wherein the determining act comprises:

determining that carrying out the request will not cause any of the page tables to contain a valid pointer to any page in the first set.

22. The method of claim 21, wherein each page table is divided into a plurality of entries, each entry comprising: (a) space to store a pointer to one of the pages, and (b) a flag indicating whether data stored in said space should be interpreted as a pointer to one of the pages, and wherein an entry in the page table is not determined to contain a valid pointer if the entry's flag indicates that the data stored in the entry's space should not be interpreted as a pointer to one of the pages.

23. The method of claim 16, wherein the memory locations are grouped into one or more pages, each of the pages having an attribute associated therewith which indicates accessibility of the page, each page's attribute being selected from a plurality of attributes, the address translation data being stored in one of more of the pages, and wherein the method further comprises:

determining that at least the pages to which the address translation data contains valid pointers and that also store portions of the address translation data are associated with a first one of the plurality of attributes.

24. The method of claim 23, wherein the act of determining that at least the pages to which the address translation data contains valid pointers and that also store portions of the address translation data are associated with a first one of the plurality of attributes comprises:

determining that carrying out the request will cause the address translation data to contain a valid mapping to a page that stores a portion of the address translation data but that is not associated with the first one of the plurality of attributes; and changing the attribute associated with said page to said first one of said plurality of attributes.

25. The method of claim 16, wherein the memory locations are grouped into pages, the address translation data being stored in one or more of the pages, the address translation data comprising:

one or more first pages that comprise entries containing pointers to the pages; and at least one second page comprising entries that contain pointers to the first pages;

and wherein the method further comprises:

determining that the second page does not contain any valid pointers to pages that do not store address translation data.

26. The method of claim 16, wherein the system provides a write instruction that writes said datum to said first of the memory locations, the write instruction being configured to perform acts comprising:

detecting whether said first memory location stores address translation data;

if said first memory location stores address translation data, then performing said determining act; and writing or not writing said specified data to said first memory location according to the result of said determining act.

27. The method of claim 26, wherein the memory locations are grouped into pages, each page having an attribute associated therewith indicating the accessibility of the page, each page's attribute being selected from a plurality of attributes, the address translation data being stored in one or more of the pages, each of the pages that stores address translation data having a first of the attributes associated therewith, and wherein the write instruction detects whether said first memory location stores address translation data based on whether the page that includes the memory location is associated with the first attribute.

28. The method of claim 26, further comprising:

generating a fault to invoke an address translation control module.

29. The method of claim 16, wherein the system provides a first write instruction and a second write instruction, said first write instruction being configured to perform acts comprising:

refusing to write said datum to said first memory location if said first memory location stores address translation data;

and said second write instruction being configured to perform acts comprising:

performing said determining act; and writing or not writing said specified data to said first memory location according to the result of said determining act.

30. The method of claim 16, further comprising:

generating a fault to invoke an address translation control module.

31. The method of claim 16, wherein the system comprises a processor that operates in at least two modes, the processor operating in a first of the modes when untrusted operations are performed and operating in a second of the two modes when trusted operations are performed, wherein the request is in the form of a first executable instruction to write said datum to the first of the memory locations and is received while the processor is operating in the first mode, and wherein the method further comprises:

changing control of the processor to the second mode prior to executing the instruction, whereby said determining act is performed while the processor is operating in the second mode;

and wherein the allowing act comprises:

in the second mode, carrying out the request by writing said datum to the first of the memory locations.

32. The method of claim 31, wherein the memory locations are grouped into pages, each of the pages being associated with an attribute that indicates accessibility, each page's attribute being selected from a plurality of attributes, the address translation data being stored in one or more of the pages, each page that stores address translation data having a first of the plurality of attributes, the system being configured to transfer control of the processor to the second mode when an attempt is made in the first mode to write to a page associated with the first of the attributes.

33. The method of claim 32, wherein the first of the attributes comprises a read-only attribute.

34. The method of claim 16, wherein said determining act comprises:

determining that carrying out the request will cause a memory location that is designated to be accessible only by the trusted source to correspond to a virtual address; and modifying the request such that carrying out the request will not cause any memory location that is designated to be accessible only by the trusted source to correspond to any virtual address.

35. In a system that comprises:
  a random access memory comprising a plurality of memory locations, each of the memory locations having a physical address;
  a storage location that stores an identifier of one of a plurality of groups of address translation data;
  an address translation component that uses the group of address translation data whose identifier is stored in the storage location to translate a virtual address into the physical address of one of the memory locations; and
  a processor that processes an instruction to load a datum into the storage location;
  the improvement comprising:
    an evaluation component that makes a determination as to whether the datum may be loaded into the storage location and that causes the instruction either to be carried our or not carried out according to the determination, the determination being based on criteria comprising:
    whether the datum is an identifier of a group of address translation data that will cause the address translation component to translate any virtual address to the physical address of a predetermined set of the memory locations.

36. The improvement of claim 35, wherein the criteria further comprise:
  whether the group of address translation data can undergo a modification such that the group of address translation data will not cause the address translation component to translate any virtual address to the physical address of the predetermined set of the memory locations,
  and wherein the evaluation component performs said modification and determines that the instruction may be carried out if said modification can be made to said group of address translation data.

37. The improvement of claim 35, wherein the criteria further comprise:
  whether the group of address translation data maps one or more predetermined virtual addresses to one or more predetermined regions of said random access memory, wherein the evaluation component determines that the instruction may be carried out if the group of address translation data maps said one or more predetermined virtual addresses to said one or more regions of said random access memory.

38. The improvement of claim 37, wherein the criteria further comprise:
  whether the group of address translation data can be modified to map one or more predetermined virtual addresses to one or more predetermined regions of said random access memory,
  and wherein the evaluation component performs said modification and determines that the instruction may be carried out if the modification can be made to said group of address translation data.

39. The improvement of claim 35, further comprising:
  a component that maintains a list values that can be loaded into the storage location;
  and wherein the criteria further comprise:
    whether the datum is included in said list of values.

40. The improvement of claim 39, wherein the datum is not included in said list of values, and wherein the evaluation component determines that the datum may be loaded into the storage location by determining that the group of address translation data identified by the datum does not contain any pointers to the predetermined set of the memory locations.

41. The improvement of claim 35, wherein each of the groups of address translation data has a base address associated therewith, and wherein each of the identifiers is the base address of a corresponding group of address translation data.

42. The improvement of claim 41, wherein each of the groups of address translation data comprises:
  a plurality of page tables, each of the page tables comprising first pointers to one or more of the memory locations; and
  a page directory storing second pointers to one or more of the page tables, each of the second pointers being locatable relative to the group's base address.

43. The improvement of claim 35, further comprising:
  logic that raises an exception upon receipt of the instruction to load a datum into the storage location; and
  an exception handler that is activated in response to the exception, wherein the exception handler either: (1) is the evaluation component, or (2) invokes the evaluation component.

44. The improvement of claim 43, wherein the system operates in at least a first mode and a second mode, untrusted operations being performed in the first mode, trusted operations being performed in the second mode, wherein the instruction is received in the first mode, and wherein the improvement further comprises:
  logic that changes the system from the first mode to the second mode upon raising of the exception, whereupon the evaluation component makes the determination while the system is operating in the second mode.

45. The improvement of claim 35, wherein the evaluation comprises hardware incorporated in, or coupled to, the system.

46. The improvement of claim 35, wherein the evaluation component comprises a set of computer-executable instructions that is executable on the processor.

47. A method of managing memory in a system that comprises:
  a memory comprising a plurality of locations, each of the locations having a physical address associated therewith;
  one or more sources, each of the sources having a group of address translation data associated therewith;
  a virtual addressing facility that permits each of the sources to address a location in the memory using a virtual address, the particular location that corresponds to the virtual address being determined at least in part by the group of address translation data associated with the source, there being at least some locations in the memory that do not correspond to a virtual address for a given source; and
  a secure environment that is associatable with a set of locations in the memory to which none of the sources has access,
  the method comprising:
    identifying a portion of the memory;
    creating a state for the system in which none of the sources can address the portion of memory using a virtual address; and
    adding to an exclusion set data indicative of said portion of memory.

48. The method of claim 47, wherein said act of creating a state comprises:
  purging any mapping to said portion of memory from each one of the groups of address translation in which a mapping to said portion of memory occurs.

49. The method of claim 47, further comprising:
  receiving a request from one of the sources to create a state in which said one of the sources would be able to address said portion of memory or a sub-portion thereof;
  determining that the portion of memory is indicated in the exclusion set; and
  denying the request.

50. The method of claim 47, wherein the memory is divided into a plurality of pages, wherein each source is assigned a set of virtually-addressable memory locations on a per-page basis, and wherein the method further comprises:
  tracking the number of sources whose corresponding group of address translation data points to a given page; and
  purging mappings to the given page from the groups of address translation data until the number of mappings that have been purged is equal to the number of sources that had pointed to the given page prior to the purging act.

51. The method of claim 47, wherein the memory is divided into a plurality of pages, wherein each source is assigned a set of virtually-addressable memory locations on a per-page basis, wherein at least some of the address translation data is stored in the pages, and wherein the method further comprises:
  tracking which of the pages store address translation data.

52. The method of claim 47, wherein the memory is divided into a plurality of pages, wherein each source is assigned a set of virtually-addressable memory locations on a per-page basis, wherein at least one of the groups of address translation data is stored in a first set of the pages, at least one of the first set of pages comprising a base address for said one of the groups, wherein the virtual facility determines to use said one of the groups to associate virtual addresses with memory locations based on which the base address for said one of the groups being loaded into a storage location, and wherein the method further comprises:
  maintaining a record of which values are base addresses for groups of address translation data.

53. The method of claim 47, wherein the system further comprises a processor that operates in a first mode and a second mode, the sources comprising untrusted processes that execute when the processor is operating in the first mode, said portion of memory being accessible only when the processor is operating in the second mode.

54. The method of claim 47, wherein the system further comprises:
  a cache of virtual addresses whose corresponding memory location have previously been looked up,
  and wherein the method further comprises:
    emptying or overwriting said cache.

55. The method of claim 47, further comprising:
  waiting for all writes to complete that were pending at the time of said identifying act.

56. A tangible computer-readable medium encoded with computer-executable instructions to implement a method of controlling memory usage in a system that comprises a plurality of memory locations, some of the memory locations being designated to be accessible only by a trusted source, each of the memory locations having a physical address, the system supporting the use of virtual addresses to address the memory locations, the memory location that corresponds at a given point in time to a given virtual address being at least partly determined by a selectable group of address translation data that is storable in the memory locations, the system further comprising a writeable storage location that contains, at any given point in time, a pointer to the particular group of address translation data that has been selected to partly determine which of the memory locations corresponds to a given virtual address, the method comprising:
  receiving a request to write a new pointer into the storage location;
  determining that loading the new pointer into the storage location will not cause any of the memory locations that are designated to be accessible only by the trusted source to correspond to any virtual address; and
  allowing the request to proceed.

57. The tangible computer-readable medium of claim 56, wherein the system comprises a processor that operates in at least two modes, the processor operating in a first of the modes when untrusted operations are performed and operating in a second of the two modes when trusted operations are performed, wherein the request is in the form of a first executable instruction to write a datum to the storage location and is received while the processor is operating in the first mode, and wherein the method further comprises:
  in response to receiving the request, changing control of the processor to the second mode prior to executing the instruction, whereby said determining act is performed while the processor is operating in the second mode.

58. The tangible computer-readable medium of claim 56, wherein the allowing act comprises:
  in the second mode, carrying out the request by either executing the first executable instruction or executing one or more second executable instructions whose result is to write the datum to the storage location.

59. The tangible computer-readable medium of claim 56, wherein the system comprises a processor that is compatible or upwardly compatible with the INTEL x86 processor architecture, and wherein the storage location comprises the processor's CR3 register.

60. The tangible computer-readable medium of claim 56, wherein the method further comprises:
  maintaining a set of values that can be written to said storage location;
  and wherein said determining act comprises:
    determining that said new pointer is included in said set of values.

61. The tangible computer-readable medium of claim 60, wherein the selectable group of address translation data is selected from a plurality of groups of address translation data, each of the groups having a base address associated therewith, wherein the set of values that can be written to said storage location comprises the base addresses of all of the groups, and wherein the act of determining that said new pointer is included in said set of values comprises determining that the new pointer is the base address of one of the groups.

62. The tangible computer-readable medium of claim 56, wherein each group of address translation data comprises:
  a page directory comprising a plurality of directory entries, the page directory having a base address associated therewith, each directory entry being identifiable relative to the base address; and
  one or more page tables, each of the page tables having a table address, each of the page tables comprising a plurality of page table entries, each of the page table entries being identifiable relative to the table address of the page table of which the page table entry is a member, each of the directory entries containing the table address of one of the page tables, each of the page table entries containing the physical address of one of the memory locations.

63. The tangible computer-readable medium of claim 62, wherein the method further comprises:
determining that none of the directory entries or table entries in the group of address translation data pointed to by the new pointer points to a memory location that has been designated to be accessible only to a trusted source.

64. The tangible computer-readable medium of claim 62, wherein the method further comprises:
determining that none of the directory entries in the group of address translation data pointed to by the new pointer contains a valid pointer to any memory location that is not a base address of either a page directory or a page table.

65. The tangible computer-readable medium of claim 62, wherein the plurality of memory locations are organized into pages, each page having an attribute associated therewith which indicates accessibility of the page, each page's attribute being selected from a plurality of attributes, each of the page directories and page tables being stored in one of the pages, and wherein the method further comprises:
determining that at least the pages that store page tables or page directories and that are also pointed to by a valid entry in the group of address translation data pointed to by the new pointer are associated with a first one of the plurality of attributes.

66. A tangible computer-readable medium encoded with computer-executable instructions to perform a method of controlling memory usage in a system that comprises a plurality of memory locations, each of the memory locations having a physical address, the system supporting the use of virtual addresses to address the memory locations, the memory location that corresponds at a given point in time to a given virtual address being at least partly determined by modifiable address translation data that are storable in the plurality of memory locations, some of the memory locations being designated to be accessible only by a trusted source, the method comprising:
receiving from a first source a request to write a datum to a first of the memory locations, the first source being different from the trusted source;
determining that carrying out the request will not cause the address translation data to be modified in a manner that causes any of the memory locations that are designated to be accessible only by the trusted source to correspond to any virtual address; and
allowing the request to proceed.

67. The tangible computer-readable medium of claim 66, wherein the memory locations are grouped into one or more pages, each of said pages comprising an equal number of memory locations, wherein the address translation data comprises one or more page tables, each page table comprising pointers to one or more of the pages, wherein a first set of one or more pages comprises the one or more memory locations that are designated as being accessible only by a trusted source, and wherein the determining act comprises:
determining that carrying out the request will not cause any of the page tables to contain a valid pointer to any page in the first set.

68. The tangible computer-readable medium of claim 67, wherein each page table is divided into a plurality of entries, each entry comprising: (a) space to store a pointer to one of the pages, and (b) a flag indicating whether data stored in said space should be interpreted as a pointer to one of the pages, and wherein an entry in the page table is not determined to contain a valid pointer if the entry's flag indicates that the data stored in the entry's space should not be interpreted as a pointer to one of the pages.

69. The tangible computer-readable medium of claim 66, wherein the memory locations are grouped into one or more pages, each of the pages having an attribute associated therewith which indicates accessibility of the page, each page's attribute being selected from a plurality of attributes, the address translation data being stored in one of more of the pages, and wherein the method further comprises:
determining that at least the pages to which the address translation data contains valid pointers and that also store portions of the address translation data are associated with a first one of the plurality of attributes.

70. The tangible computer-readable medium of claim 66, wherein the memory locations are grouped into pages, the address translation data being stored in one or more of the pages, the address translation data comprising:
one or more first pages that comprise entries containing pointers to the pages; and
at least one second page comprising entries that contain pointers to the first pages;
and wherein the method further comprises:
determining that the second page does not contain any valid pointers to pages that do not store address translation data.

71. The tangible computer-readable medium of claim 66, wherein the system provides a write instruction that writes said datum to said first of the memory locations, the write instruction being configured to perform acts comprising:
detecting whether said first memory location stores address translation data;
if said first memory location stores address translation data, then performing said determining act; and
writing or not writing said specified data to said first memory location according to the result of said determining act.

72. The tangible computer-readable medium of claim 71, wherein the memory locations are grouped into pages, each page having an attribute associated therewith indicating the accessibility of the page, each page's attribute being selected from a plurality of attributes, the address translation data being stored in one or more of the pages, each of the pages that stores address translation data having a first of the attributes associated therewith, and wherein the write instruction detects whether said first memory location stores address translation data based on whether the page that includes the memory location is associated with the first attribute.

73. The tangible computer-readable medium of claim 66, wherein the system provides a first write instruction and a second write instruction, said first write instruction being configured to perform acts comprising:
refusing to write said datum to said first memory location if said first memory location stores address translation data;
and said second write instruction being configured to perform acts comprising:
performing said determining act; and
writing or not writing said specified data to said first memory location according to the result of said determining act.

74. The tangible computer-readable medium of claim 66, wherein the system comprises a processor that operates in at least two modes, the processor operating in a first of the modes when untrusted operations are performed and operating in a second of the two modes when trusted operations are performed, wherein the request is in the form of a first executable instruction to write said datum to the first of the memory locations and is received while the processor is operating in the first mode, and wherein the method further comprises:
    changing control of the processor to the second mode prior to executing the instruction, whereby said determining act is performed while the processor is operating in the second mode;
    and wherein the allowing act comprises:
        in the second mode, carrying out the request by writing said datum to the first of the memory locations.

75. The tangible computer-readable medium of claim 74, wherein the memory locations are grouped into pages, each of the pages being associated with an attributes that indicates accessibility, each page's attribute being selected from a plurality of attributes, the address translation data being stored in one or more of the pages, each page that stores address translation data having a first of the plurality of attributes, the system being configured to transfer control of the processor to the second mode when an attempt is made in the first mode to write to a page associated with the first of the attributes.

76. The tangible computer-readable medium of claim 75, wherein the first of the attributes comprises a read-only attribute.

77. The tangible computer-readable medium of claim 66, wherein said determining act is performed after said allowing act.

78. A tangible computer-readable medium encoded with computer-executable instructions for performing a method of managing memory in a system that comprises:
    a memory comprising a plurality of locations, each of the locations having a physical address associated therewith;
    one or more sources, each of the sources having a group of address translation data associated therewith;
    a virtual addressing facility that permits each of the sources to address a location in the memory using a virtual address, the particular location that corresponds to the virtual address being determined at least in part by the group of address translation data associated with the source, there being at least some locations in the memory that do not correspond to a virtual address for a given source; and
    a secure environment that is associatable with a set of locations in the memory to which none of the sources has access;
    the method comprising:
        identifying a portion of the memory;
        creating a state for the system in which none of the sources can address the portion of memory using a virtual address; and
        adding to an exclusion set data indicative of said portion of memory.

79. The tangible computer-readable medium of claim 78, wherein said act of creating a state comprises:
    purging any mapping to said portion of memory from each one of the groups of address translation in which a mapping to said portion of memory occurs.

80. The tangible computer-readable medium of claim 78, wherein the method further comprises:
    receiving a request from one of the sources to create a state in which said one of the sources would be able to address said portion of memory or a sub-portion thereof,
    determining that the portion of memory is indicated in the exclusion set; and denying the request.

81. The tangible computer-readable medium of claim 78, wherein the memory is divided into a plurality of pages, wherein each source is assigned a set of virtually-addressable memory locations on a per-page basis, and wherein the method further comprises:
    tracking the number of sources whose corresponding group of address translation data points to a given page; and
    purging mappings to the given page from the groups of address translation data until the number of mappings that have been purged is equal to the number of sources that had pointed to the given page prior to the purging act.

82. The tangible computer-readable medium of claim 78, wherein the memory is divided into a plurality of pages, wherein each source is assigned a set of virtually-addressable memory locations on a per-page basis, wherein at least some of the address translation data is stored in the pages, and wherein the method further comprises:
    tracking which of the pages store address translation data.

83. The tangible computer-readable medium of claim 78, wherein the memory is divided into a plurality of contiguous pages, wherein each source is assigned a set of virtually-addressable memory locations on a per-page basis, wherein at least one of the groups of address translation data is stored in a first set of the pages, at least one of the first set of pages comprising a base address for said one of the groups, wherein the virtual facility determines to use said one of the groups to associate virtual addresses with memory locations based on which the base address for said one of the groups being loaded into a storage location, and wherein the method further comprises:
    maintaining a record of which values are base addresses for groups of address translation data.

84. The tangible computer-readable medium of claim 78, wherein the system further comprises a processor that operates in a first mode and a second mode, the sources comprising untrusted processes that execute when the processor is operating in the first mode, said portion of memory being accessible only when the processor is operating in the second mode.

85. The tangible computer-readable medium of claim 78, wherein the system further comprises:
    a cache of virtual addresses whose corresponding memory location have previously been looked up,
    and wherein the method further comprises:
        emptying or overwriting said cache.

86. The tangible computer-readable medium of claim 78, wherein the method further comprises:
    waiting for all write to complete that were pending at the time of said identifying act.

* * * * *